United States Patent
Rustagi et al.

(10) Patent No.: US 8,792,501 B1
(45) Date of Patent: Jul. 29, 2014

(54) ACTIVE-ACTIVE MULTI-HOMING WITH MULTI-CHASSIS PSEUDOWIRE LINK AGGREGATION

(75) Inventors: Sunesh Rustagi, San Jose, CA (US); Ramasamy Ramanathan, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 379 days.

(21) Appl. No.: 13/162,157

(22) Filed: Jun. 16, 2011

Related U.S. Application Data (60) Provisional application No. 61/489,972, filed on May 25, 2011.

(51) Int. Cl.
*H04L 12/56* (2006.01)

(52) U.S. Cl.
USPC ...... 370/395.53; 370/401; 370/217; 370/392; 370/389

(58) Field of Classification Search
CPC ..... H04L 45/28; H04L 12/4641; H04L 45/00; H04L 45/22; H04L 45/04; H04L 45/58
USPC ............ 370/395.53, 217, 392, 401, 254, 389, 370/225
See application file for complete search history.

(56) References Cited

U.S. PATENT DOCUMENTS

| | | | |
|---|---|---|---|
| 2007/0183376 A1* | 8/2007 | Arai et al. | 370/338 |
| 2008/0181196 A1 | 7/2008 | Regan et al. | |
| 2009/0274155 A1 | 11/2009 | Nakash | |
| 2011/0222413 A1 | 9/2011 | Shukla et al. | |
| 2012/0033672 A1* | 2/2012 | Page et al. | 370/395.53 |

OTHER PUBLICATIONS

Martini et al. "Inter-Chassis Communication Protocol for L2VPN PE Redundancy", draft-ietf-pwe3-iccp-04.txt, Internet Engineering Task Force, Oct. 13, 2010, p. 1-78.
Kompella et al. "Virtual Private LAN Service (VPLS) Using BGP for Auto-Discovery and Signaling", RFC 4761, Network Working Group, The IETF Trust, Jan. 2007, p. 1-27.
Kompella et al. "Multi-homing in BGP-based Virtual Private LAN Service draft-kompella-12vpn-vpls-multihoming-01.txt" RFC 4761, Network Working Group, BGP VPLS Multi-Homing, Jul. 2008, p. 1-18.
U.S. Appl. No. 12/246,810, filed Oct. 7, 2008, entitled, "Inter-Autonomous System (AS) Virtual Private Local Area Network Service (VPLS)," Kompella et al.

* cited by examiner

*Primary Examiner* — Jamal Javaid
(74) *Attorney, Agent, or Firm* — Shumaker & Sieffert, P.A.

(57) ABSTRACT

Techniques are described for forwarding packets in a VPLS using multi-homing PE routers configured in an "active-active" link topology. A router includes a control unit that forms a customer-facing multi-chassis link aggregation group (LAG) to include a plurality of active access links that couple the router and a second router to a multi-homed customer site associated with the VPLS domain. The control unit also forms a core-facing multi-chassis LAG within the VPLS domain to include a plurality of pseudowires that connect the router and other member routers of the core-facing LAG to a common remote router of the VPLS domain. The router receives layer two (L2) packets from the multi-homed customer site on one or more of the active access links and forwards the L2 packets to the remote router over one or more of the pseudowires using the core-facing multi-chassis LAG.

10 Claims, 5 Drawing Sheets

ACTIVE-ACTIVE MULTI-HOMING WITH MULTI-CHASSIS PSEUDOWIRE LINK AGGREGATION

This application claims the benefit of U.S. Provisional Application No. 61/489,972, filed May 25, 2011, the entire content of which is incorporated by reference herein.

TECHNICAL FIELD

This disclosure relates to computer networks and, more particularly, to virtual private local area networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers, and the like) are connected by one or more Ethernet switches. The Ethernet switches forward Ethernet frames, also referred to as L2 communications or L2 packets to devices within the network. As the Ethernet switches forward the Ethernet frames, the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

A virtual private local area network service (VPLS) is one example of an L2 virtual private network (VPN) service that may be used to extend two or more remote customer networks, i.e., VPLS sites, through a layer three (L3) intermediate network (usually referred to as the VPLS core) in a transparent manner, i.e., as if the intermediate network does not exist and the remote customer networks are instead directly connected to one another. In particular, the VPLS transports L2 communications, such as Ethernet packets, between customer networks via the intermediate network. In a typical configuration, provider edge (PE) routers coupled to the customer networks operate as ingress and egress for label switched paths (LSPs) or other tunnels that may be used as pseudowires within the provider network to carry encapsulated L2 communications as if the customer networks were directly attached to the same local area network (LAN). These PE routers may be referred to as "members of the VPLS domain" in that they run a VPLS instance for the VPLS domain and maintain L2 state information for the VPLS service. The PE routers may use either Border Gateway Protocol (BGP) or Label Distribution Protocol (LDP) as the control plane protocol for signaling the VPLS service. While VPLS is an example of a multipoint-to-multipoint service, an L2 virtual circuit or pseudowire is an example of a point-to-point service that may be used to connect two remote customer networks.

In some cases, a customer network site may be given redundant connectivity to a network through multiple PE routers. This form of redundancy is referred to as "multi-homing." In multi-homing, one of the multiple PE routers coupled to the customer network is traditionally chosen as the active PE router, or designated forwarder, to send traffic to and from the customer network. The other one or more PE routers are designated as backup forwarders which can be used to send traffic to and from the customer network in the event of a network failure that would preclude the current designated forwarder from sending the traffic. As such, multi-homed deployments have traditionally utilized an "active-standby" link topology where the standby link is only used when the active link is disabled. The "active-standby" link topology avoids certain issues associated with a multi-homed deployment, e.g., packet duplicates, MAC moves, and loops, but may be wasteful of resources because only a single link is used to handle network traffic at any given time.

SUMMARY

The techniques described herein generally facilitate an "active-active" link topology in a multi-homed layer two (L2) network where the traditional issues of packet duplicates, MAC moves, and data loops are avoided. Rather than only one of the multi-homing PE routers operating as an active designated forwarder and all of the other multi-homing PE routers operating as standby or backup forwarders, all of the multi-homing PE routers in a multi-homed deployment can be made active concurrently.

For example, the customer-facing "active-active" multi-homing PE routers of the VPLS core are configured to form a multi-chassis link aggregation group ("LAG") of the L2 interfaces that service the physical access links of the multi-homed customer network. Moreover, as described herein, the PE routers that service the pseudowires within the VPLS core are configured to construct a form of a multi-chassis LAG of the pseudowires PE that carry the encapsulated L2 communications through the VPLS core. In operation, the multi-homing PE routers receive L2 communications from physical links of the customer-facing LAG and forward the L2 communications onto the pseudowires of the core-facing LAG as if the pseudowires within the VPLS core were a single link. Similarly, other routers within the VPLS core forward L2 communications to the active-active multi-homing routers the pseudowires as if the pseudowires constituted a single link within the VPLS core. In this manner, the PE routers apply link aggregation and extend the link aggregation to pseudowires or other tunneling technologies to help achieve active-active multi-homing in an access network of an L2 VPN topology, e.g., VPLS network. The techniques may avoid duplicate packets and data loops even though the multi-homed VPLS site utilizes an active-active link topology.

In one embodiment, a method comprises forming, with a first provider edge (PE) router within a virtual private local area network service (VPLS) domain, a customer-facing multi-chassis link aggregation group (LAG) to include a plurality of active access links coupled to a multi-homed customer site associated with the VPLS domain, the multi-homed customer site being coupled to the first PE router via a first one of the active links and to a second PE router within the VPLS domain via a second one of the active links. The method further comprises forming a core-facing multi-chassis LAG within the VPLS domain to include a plurality of pseudowires from the first and second PE routers to a remote PE router of the VPLS domain, wherein the first and second PE routers communicate L2 packets associated with the multi-homed VPLS customer site through the VPLS domain with the remote PE router using the plurality of pseudowires. The method further comprises forwarding the L2 packets from the first PE router and the second PE router to the remote PE router over the pseudowires of the core-facing multi-chassis LAG of the VPLS domain as a single link.

In another embodiment, a router comprises a control unit configured to form a customer-facing multi-chassis link aggregation group (LAG) to include a plurality of active access links that couple the router and a second router to a multi-homed customer site associated with the VPLS domain. The control unit is configured to form a core-facing multi-chassis LAG within the VPLS domain to include a plurality of pseudowires that connect the router and the second router to a common remote router of the VPLS domain. An interface of the router receives layer two (L2) packets from the multi-homed customer site on one or more of the active access links. A forwarding engine of the router forwards the L2 packets from the router to the remote router over one or more of the pseudowires of the core-facing multi-chassis LAG.

In another embodiment, a computable-readable device stores program code to cause a processor of a network router to form a customer-facing multi-chassis link aggregation group (LAG) to include a plurality of active access links that couple a multi-homed customer site to a plurality of routers associated with a virtual private local area network service (VPLS) domain. The program code further causes the processor to form a core-facing multi-chassis LAG within the VPLS domain to include a plurality of pseudowires from the plurality of routers to a remote PE router of the VPLS domain. The program code generates forwarding information to include a logical interface for the customer-facing multi-chassis LAG and a logical interface for the core-facing multi-chassis LAG and installs the forwarding information within a forwarding component of the router to control transport of layer two (L2) packets between the customer site and the remote PE router via the VPLS domain The details of one or more embodiments are set forth in the accompanying drawings and the description below. Other features, objects, and advantages will be apparent from the description and drawings, and from the claims.

DETAILED DESCRIPTION

Figure 1:
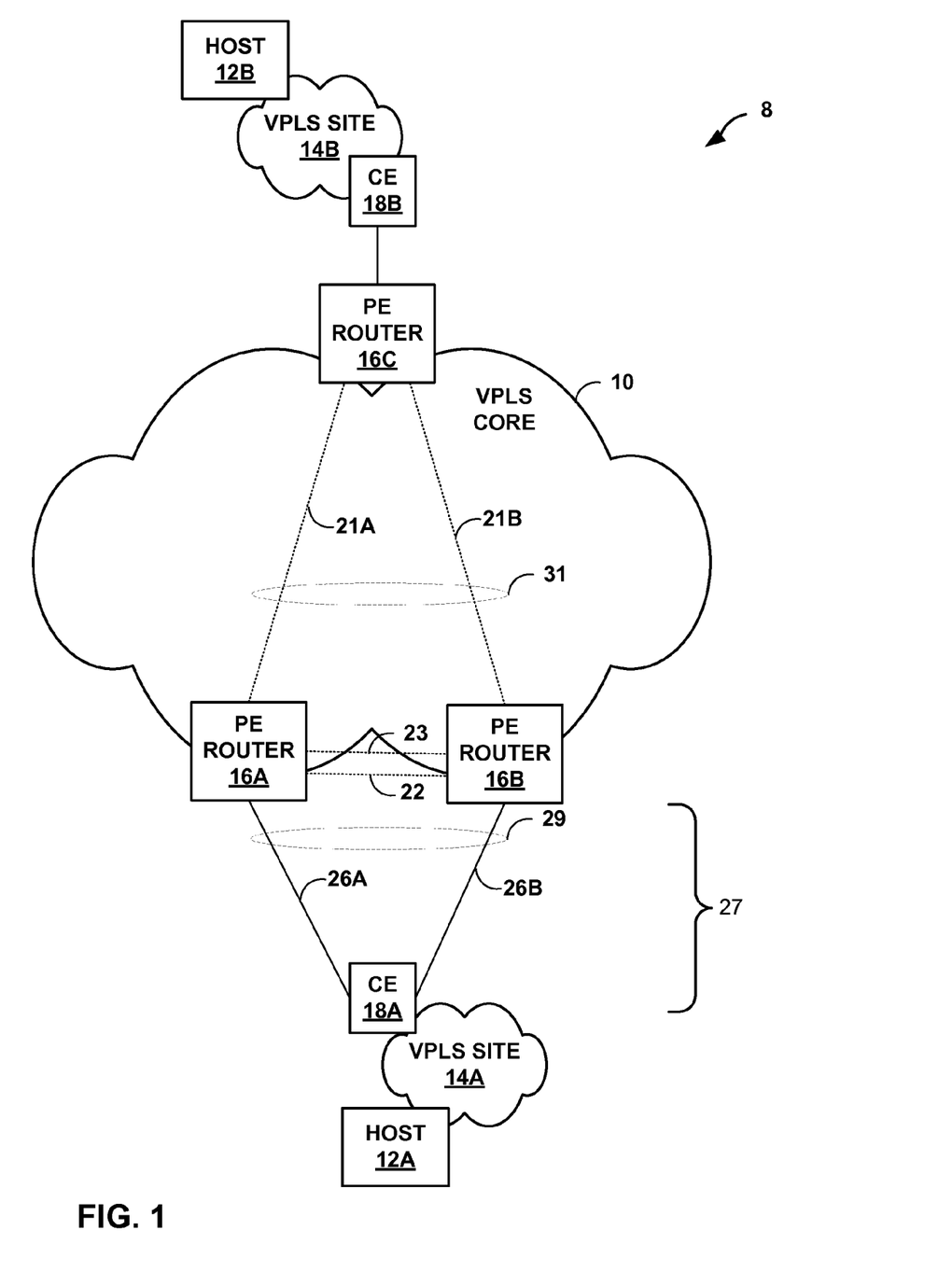
FIGS. 1-3 are block diagrams illustrating an example system that supports an active-active multi-homed VPLS site in accordance with the techniques of this disclosure.

FIG. 1 is a block diagram illustrating an example system 8 in which a routed layer three (L3) service provider network 10 is a VPLS core to provide layer two (L2) connectivity between hosts 12A-12B of VPLS sites 14A-14B ("VPLS sites 14"). That is, virtual private local area network service (VPLS) may be used to extend L2 connectivity for two or more remote networks, e.g., VPLS sites 14, through L3 SP network 10 in a transparent manner, as if intermediate SP network 10 does not exist. In particular, the VPLS transports layer two (L2) communications, such as Ethernet packets, between one or more host devices 12A-12D ("host devices 12") within VPLS sites 14 via SP network 10. In a typical configuration, provider edge (PE) routers 16 exchange L2 frames (e.g., Ethernet frames) with customer edge (CE) routers 18A-18C ("CE routers 18"). Although shown for purposes of example as CE routers, PE routers 16 may in some examples be coupled to VPLS sites 14 by other devices, such as network switches.

PE routers 16 are interconnected by a set of label switched paths (LSPs) that may be used as VPLS pseudowires within L3 SP network 10 to carry encapsulated L2 communications as if the customer networks were directly attached to the same local area network (LAN). In BGP-based VPLS networks, BGP is used as the control plane protocol for signaling the VPLS service, but it should be understood that other appropriate protocols may also be used. PE routers 16 that participate in the BGP-based VPLS signaling and maintain L2 state information for the customer sites may be referred to as "members of the VPLS domain." In the example of FIG. 1A, VPLS PW 21A is established to carry communications between PE router 16A and 16C, and VPLS PW 21B is established to carry communications between PE router 16B and PE router 16C. VPLS PWs 21 may be bi-directional pseudowires. Additional details related to VPLS can be found in K. Kompella, "Virtual Private LAN Service (VPLS) Using BGP for Auto-discovery and Signaling," Request for Comments: 4761, The IETF Trust, January 2007, which is hereby incorporated by reference in its entirety.

In the example of FIG. 1A, VPLS site 14A is connected by a bridged L2 access network 27 that provides redundant physical L2 connectivity to SP network 10 through multiple PE routers 16A, 16B via links 26A and 26B, a technique which is referred to as "multi-homing." Specifically, VPLS site 14A, via CE router 18A, is multi-homed to SP network 10 through PE routers 16A and 16B. Additional details related to multi-homing in BGP-based VPLS can be found in K. Kompella, "Multi-homing in BGP-based Virtual Private LAN Service," draft-kompella-12vpn-vpls-multihoming-02.txt, IETF Internet Draft 4761, November 2008, which is hereby incorporated by reference in its entirety.

As shown, multi-homing PE routers 16A, 16B are configured to form a multi-chassis link aggregation group ("LAG") 29 for physical access links 26A, 26B within bridged L2 access network 27 that provide L2 connectivity for multi-homed VPLS site 14A. In one example, each of CE router 18A and PE routers 16A, 16B optionally execute the Link Aggregation Control Protocol (LACP) to bundle physical interfaces associated with access links 26A, 26B and treat the bundle as a single logical interface in terms of L2 forwarding. That is, CE router 18A associates links 26A, 26B with a single logical interface for purposes of L2 forwarding to utilize the links in parallel to increase the link speed beyond the limits of any one single cable or port, and to increase the redundancy for higher availability. Moreover, PE routers 16A, 16B form LAG 29 as a multi-chassis LAG in that physical links 26A, 26B do not solely interconnect two network devices but instead provide CE 18A with connectivity to different network devices, i.e., PE routers 16A and 16B. PE routers 16A, 16B may execute an inter-chassis communication protocol (ICCP) to establish inter-chassis communication channel 22 and control forwarding with respect to LAG 29 as a single interface for reaching CE router 18A. That is, although separate devices, PE routers 16A, 16B collectively treat LAG 29 as a single logical interface from a forwarding perspective even though each of the PE routers connect to only a subset of the physical links 26A, 26B that comprises the overall LAG. PE routers 16A, 16B communicate L2 packets received from LAG 29 to each other on inter-chassis communication channel 22. Example details on an LACP can be found in IEEE 802.3ad, Aggregation of Multiple Link Segments, the contents of which are incorporated herein by reference. Example details on an ICCP can be found in Martini et. al, Inter-Chassis Communication Protocol for L2VPN PE Redundancy, IETF, Oct. 13, 2010, the contents of which are incorporated herein by reference.

In traditional multi-homing implementations, one of the PE routers, e.g., PE router 16A, is chosen to be the active PE router, or designated forwarder, to send L2 traffic to and from the customer network (VPLS site 14A) via access network 27. The other multi-homing PE router, e.g., PE router 16B, is designated as a backup forwarder which can be used to send L2 traffic to and from the customer network in the event of a network failure that would preclude the current designated forwarder from sending the traffic. As such, traditional multi-homing implementations utilize an "active-standby" link topology where the standby link is only used when the active link is disabled. However, the traditional "active-standby" link topology may be wasteful of network resources because only a single link is used to handle network traffic at any given time. In accordance with the techniques of this disclosure, network resources may be more fully utilized through the use of an "active-active" link topology where all of the multi-homing PE routers in a multi-homed deployment are made active.

To provide the "active-active" link topology for multi-homed, bridged L2 access network 27, PE routers 16A-16C construct and form a second, core-facing LAG 31 of pseudowires 21A, 21B that carry the encapsulated L2 communications through the L3 routed network, i.e., VPLS core 10. That is, PE router 16C is configured to form core-facing LAG 31 for the pseudowires of the VPLS core that connect PE router 16C to other PEs that are part of customer-facing multi-chassis LAG group, i.e., LAG 31 in this example. Formation of a second multi-chassis LAG of the core-facing pseudowires 21A, 21B may help achieve active-active multi-homing of CE 18A within bridged L2 access network 27. PE routers 16A, 16B form LAG 31 as a multi-chassis LAG comprising a set of bundled pseudowires and utilize ICCP to establish inter-chassis communication channel 23. Further, PE routers 16A, 16B control forwarding with respect to the LAG 31 as a single logical interface for reaching PE router 16C. That is, PE routers 16A, 16B collectively treat LAG 31 as a single logical interface from a forwarding perspective even though each of the PE routers connects to only a subset of the pseudowires 21 that comprises the overall multi-chassis LAG. PE routers 16A, 16B communicate VPLS packets received from LAG 31 to each other on inter-chassis communication channel 23.

Under conventional approaches, it may not be possible to utilize active-active link topology for a customer-facing LAG when the bridged L2 network is connected to a VPLS core. In other words, the L2 connectivity of the bridged L2 network typically cannot be extended into VPLS core when active-active multi-homing is used in the access network. In such a configuration, for example, remote PE router 16C may continuously receive L2 communications from customer device (e.g., host 12A) on both pseudowires 21A, 21B, causing PE router 16C to learn the L2 MAC address for host 12A on both interfaces associated with the pseudowires. This in turn may lead to problems with respect to L2 forwarding within the VPLS core as PE router 16C may output duplicate L2 packets to host 12A on the pseudowires 21A, 21B, which may further lead to the duplicate packets being received by host 12A. As another example, the continuous receipt of L2 traffic from host 12A over both pseudowires 21A, 21B may cause remote PE router 16C to continually perform "MAC moves," i.e., update its separate MAC tables associated with the pseudowires as if host 12A has moved and is now reachable on a different interface. By forming a core facing LAG 31, L2 forwarding components within PE router 12C treats the group of pseudowires as a single interface. As such, the L2 forwarding components of PE router 12C apply L2 forwarding as if the pseudowires constitute a single interface having a single MAC table. As such, the techniques may avoid MAC moves, data loops, and duplicate packets that otherwise might arise within VPLS network 10 when the multi-homed VPLS site 14A utilizes an active-active link topology. As such, the techniques allow L2 service to be extended from bridged access network 27 through intermediate network 10 to PE router 16C by a VPLS core.

In operation, the multi-homing PE routers 16A, 16B receive L2 communications from physical links 26A, 26B of the customer-facing LAG 29 and ingress the L2 communications into the VPLS core by forwarding corresponding VPLS packets onto pseudowires 21A, 21B of the core-facing LAG 31 as if the pseudowires within VPLS core 10 were a single link. PE routers 16A, 16B exchange the L2 communications with each other on inter-chassis communication channel 22, possibly for forwarding to other remote PEs that may be part of the VPLS instance. However, PE routers 16A, 16B do not forward the L2 communications from inter-chassis communication channel 22 to LAG 31 given that the L2 communications were already received and processed by a different member device of the customer-facing multi-chassis LAG 29. Similarly, remote PE router 16C within VPLS core 10 forwards L2 communications to the active-active multi-homing PE routers 16A, 16B on pseudowires 21A, 21B as if the pseudowires constituted a single link within the VPLS core. By treating pseudowires 21A, 21B as a core-facing LAG, PE router 16C may utilize a single MAC table associated with the logical interface of the bundled pseudowires and, therefore, may avoid sending duplicate VPLS packets. PE routers 16A, 16B egress the L2 communications onto access links 26 and exchange the VPLS packets via inter-chassis communication channel 23, possibly for egressing to other L2 access links. PE routers 16A, 16B do not egress the VPLS packets exchange on inter-chassis communication channel 23 to access links 26 since that the other PE router of has already received the VPLS packets on core-facing LAG 31 and egressed the packet to customer-facing LAG 29. In this manner, PE routers 16 utilize both a customer-facing multi-chassis LAG on physical access links and core-facing multi-chassis LAG on pseudowires through a VPLS core to help achieve active-active multi-homing in bridged access network 27 coupled to a routed L2 VPN topology, e.g., VPLS network 10.

Figure 2:
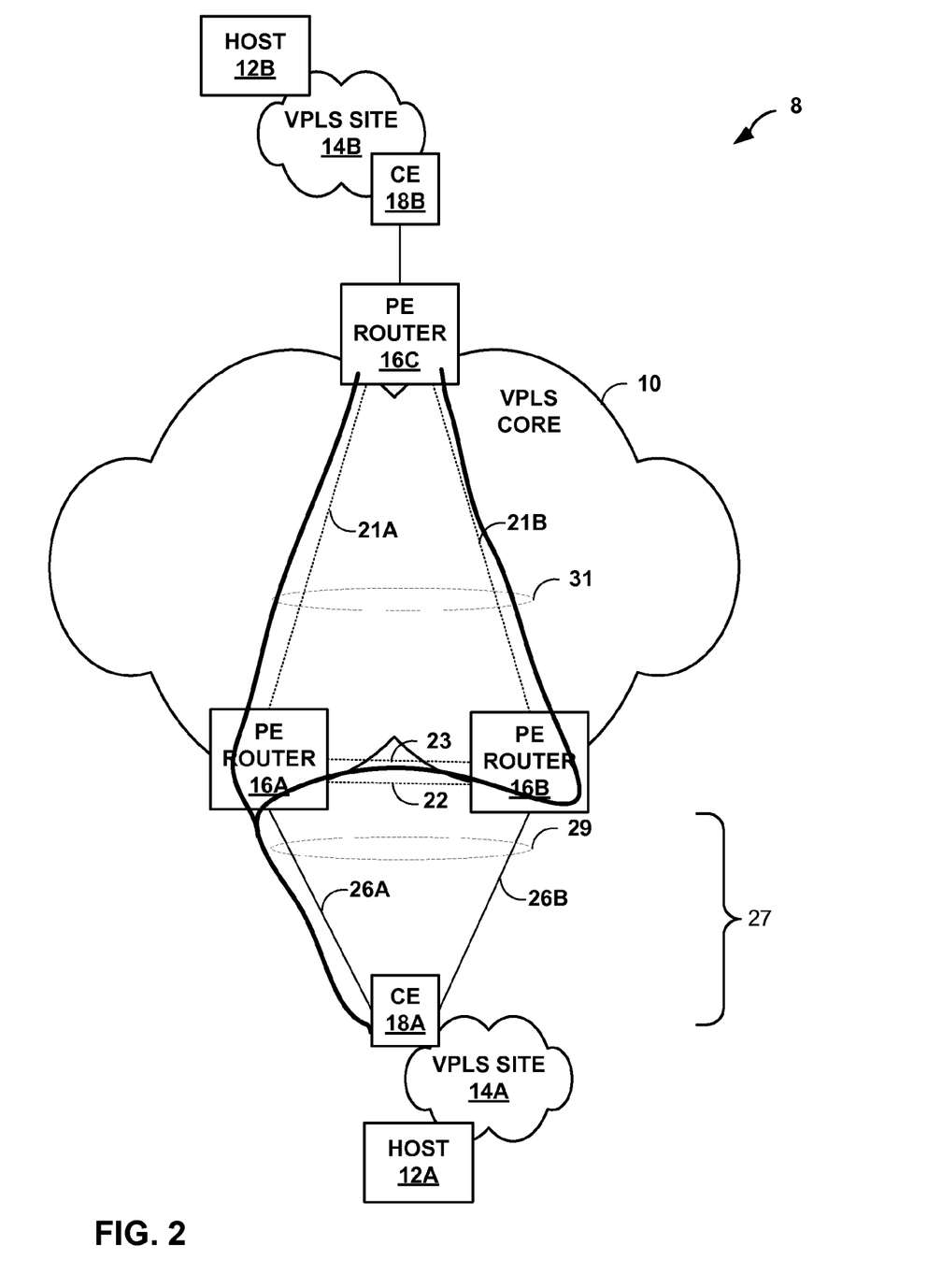

FIG. 2 is a block diagram illustrating flow of network traffic through network 8 in the event of failure of access link 26B. In the case of failure, use of LAG 29 causes CE 18A, and PEs 16A, 16B to forward L2 communications in access network 27 over the remaining access links of the LAG, i.e., access link 26A in this example. As such, customer-facing LAG 29 offers protection for failure of a physical access link within the active, active LAG.

Figure 3:
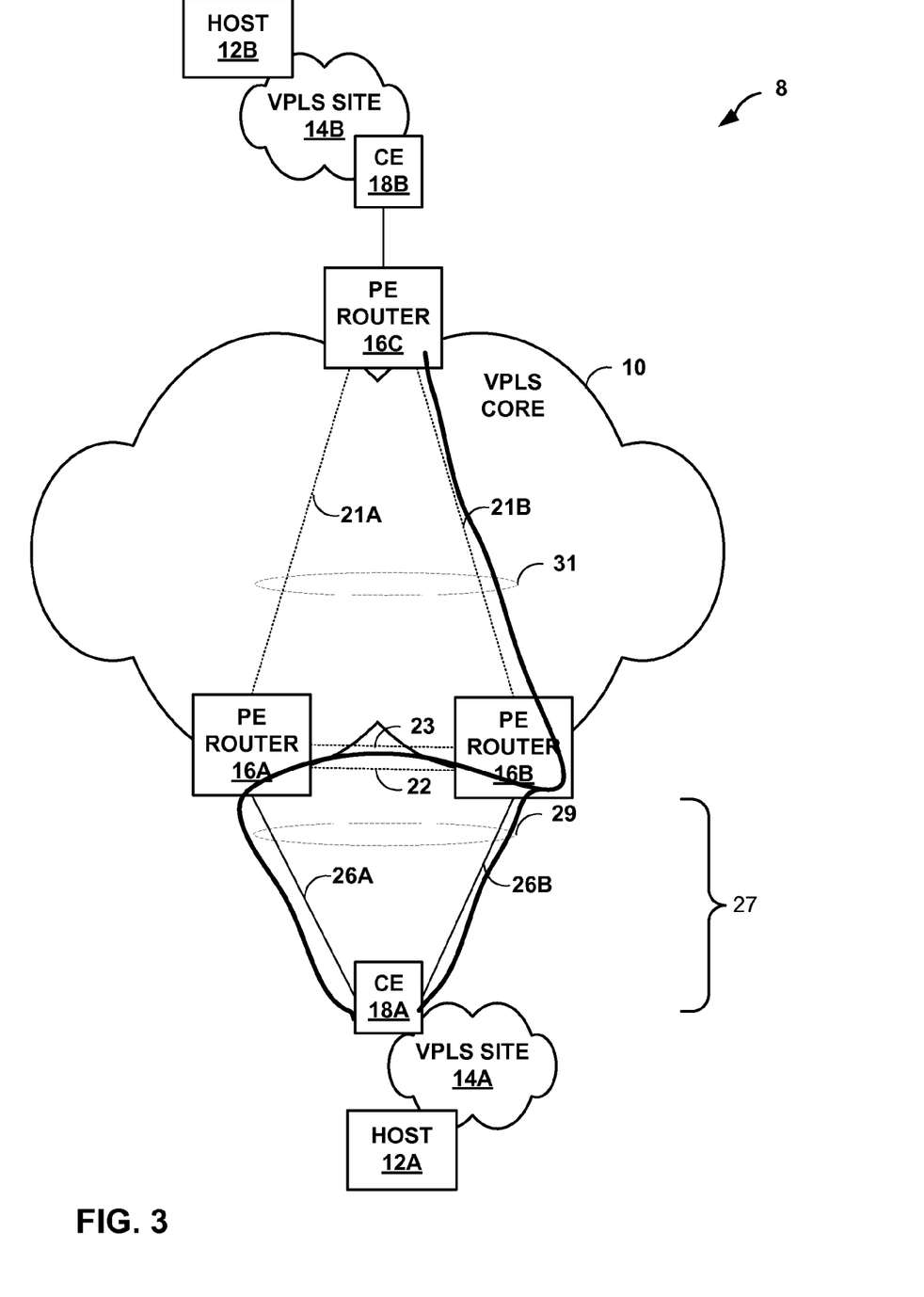

FIG. 3 is a block diagram illustrating flow of network traffic through network 8 in the event of failure of pseudowire 21A. In the case of failure, use of core-facing LAG 31 causes PEs 16 to forward VLPS packets in VPLS core 10 over the remaining pseudowires of the LAG, i.e., pseudowire 21B in this example. As such, core-facing LAG 31 offers protection for failure of a logical pseudowire within the LAG.

Figure 4:
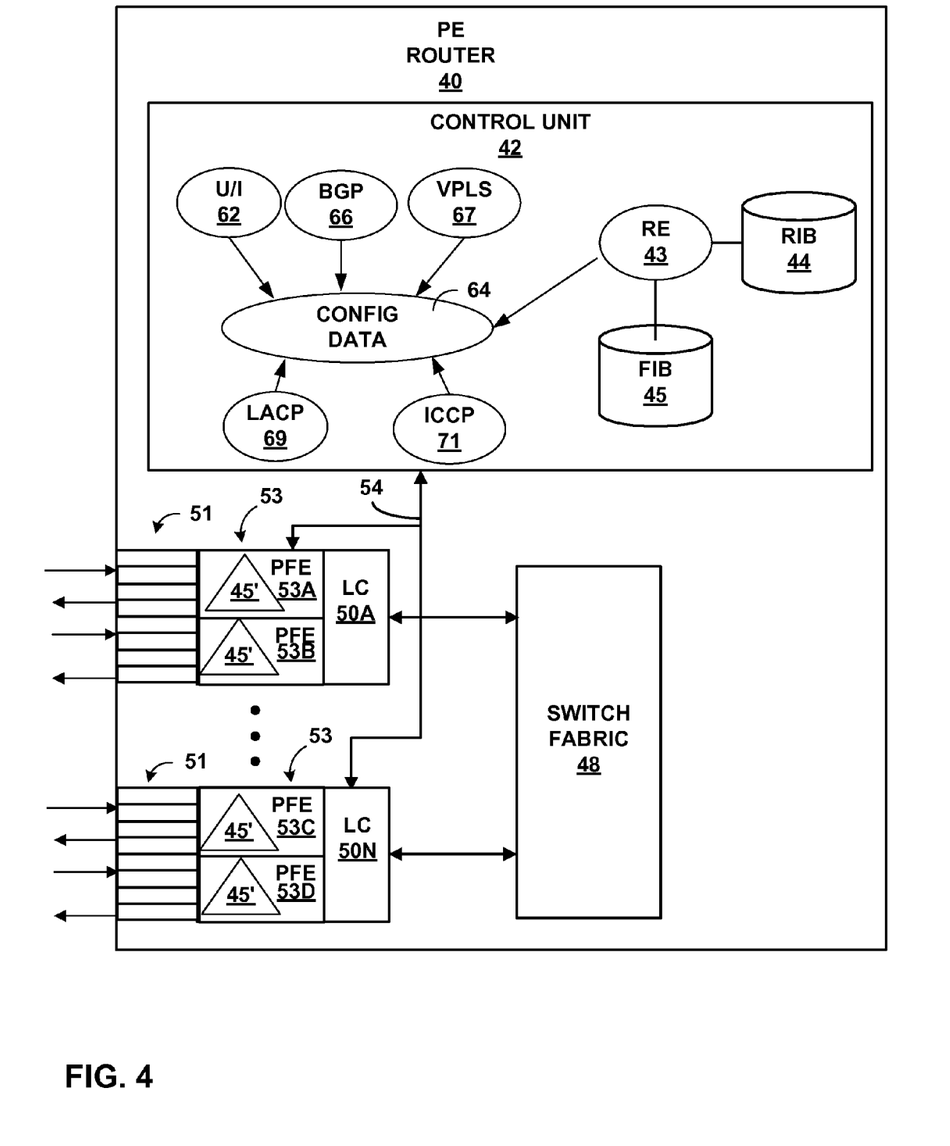
FIG. 4 is a block diagram illustrating an example router configured to participate in an "active-active" link topology in a multi-homed network in accordance with the techniques described herein.

FIG. 4 is a block diagram illustrating an example PE router 40 configured to facilitate an "active-active" link topology for a multi-homed network in accordance with the techniques described herein. For example, router 40 may comprise any of routers 16 of FIGS. 1-3.

In this example, PE router 40 includes control unit 42 that provides control plane functionality for the network device. PE router 40 also includes switch fabric 48 interconnecting a set of line cards ("LCs") 50A-50N, each of which includes a one or more of packet-forwarding engines ("PFEs") 53 that send and receive traffic by a set of interface cards 51 ("IFCs 51") that typically have one or more physical network interfaces (ports). LCs 50, components thereof, and switch fabric 48 collectively provide a data plane for forwarding transient network traffic, such as the L2 packets described herein. Although not shown in FIG. 4, PFEs 53 may each comprise a central processing unit (CPU), memory and one or more programmable packet-forwarding application-specific integrated circuits (ASICs). Switch fabric 48 provides a high-speed interconnect for forwarding incoming data packets between PFEs 53 for transmission over a network.

Control unit 42 provides an operating environment for various protocols that perform control plane functions for PE router 40. For example, control unit 42 includes BGP 66 as the control plane protocol for signaling the VPLS service 67, such as signaling and establishing the individual pseudowires to transport the VPLS packet through the VPLS core. VPLS service 67 implements the VPLS protocol, such as including flooding and layer two (L2) learning, e.g., learning of customer device MAC addresses, from inbound PWs and association of those customer MAC addresses with corresponding outbound PWs and output interfaces. VPLS module 67 may maintain MAC tables for each VPLS instance established by router 40. Learning and flooding may alternatively reside within PFEs 53. Example details of MAC learning by a router within a VPLS domain are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

Control unit 42 may also provide an operating environment for execution of a routing protocol 43 that controls L3 routing and L2 forwarding functions. In general, routing protocol 43 maintains a routing information based (RIB) 44 that stores L3 routing information and L2 topology data representing a logical topology of the L2 network, e.g., a spanning tree, from the perspective of the interfaces. RIB 44 may also store updated MAC tables, MPLS label allocations and pseudowire information. Based on RIB 44, RE 43 generates forwarding information based (FIB) 45 to contain forwarding data structures for installing within (e.g., programming) PFEs 53.

In the example of FIG. 4, control unit 42 includes a user interface ("U/I") 62 with which an administrator interacts, either directly or by way of a provisioning system or software agent, to select a set of logical interfaces for pseudowires to be included in a core-facing LAG that transport VPLS packets containing L2 communications associated with a customer-facing LAG of an active-active physical access links. User interface 62 stores the information as configuration data 64. Link Aggregation Control Protocol (LACP) 69 (optional) operates in a modified manner to bundle logical interfaces associated with the selected pseudowires and treat the bundle as a single logical interface in terms of L2 forwarding. In this example, LACP 69 forms the LAG of pseudowires as a multi-chassis LAG that connects to different network devices. In the case router 40 is coupled to the multi-homed, active-active access network, the administrator may interact with U/I 62 to form the customer-facing LAG of multi-homed L2 access links. RE 43 may generate FIB 45 to include forwarding information that specifies both the customer-facing LAG and the core-facing LAG, including the respective logical interface and the group of underlying physical links and pseudowires. In some embodiments, LACP 69 is configured to detect the customer-facing multi-chassis LAG of the plurality of active access links. In response, LACP 69 may automatically identify the plurality of pseudowires as a set of pseudowires within the VPLS domain that originate from either the routers servicing the active access links and that are terminated by a common remote router and form the core-facing multi-chassis LAG to include the identified set of pseudowires.

In addition, router 40 may automatically inform other PE routers as to its configuration with respect to its ability to support customer-facing LAG of pseudowires as well as any information identifying the particular set of pseudowires having an endpoint on a router that services an active-active L2 access network. In this case, router 40 may utilize messages according to LACP 69 to communicate with the other routers or may utilize BGP 66 to send BGP messages that have been extended to include opaque TLVs that specify the pseudowires that are to be included in the core-facing LAG. For example, in some implementations, BGP 66 may utilize configuration data 64 to generate the information to be included in TLVs that are included in BGP communications with the other multi-homing routers. For example, BGP 66 may generate a message that notifies other routers that the router is configured to participate in an "active-active" link topology configuration with the other routers. In this way, LACP 69 may also announce its support for customer-facing pseudowire-based LAGs using TLVs included in BGP communications sent to the other multi-homing routers. The techniques described herein do not require modifications to BGP signaling for the VPLS. If a PE router configured as described herein encounters another PE router that does not support this feature, the configured PE router operates according to the conventional operation.

In the example of FIG. 4, control unit 42 is connected to each of LCs 50 by a dedicated internal communication link 54. For example, dedicated link 54 may comprise a 200 Mbps or Gigabit Ethernet connection for internal communication between the multiple components of router 40. In one embodiment, control unit 42 communicates data representative of a software copy 45' of FIB 45 into PFEs 53 to program the PFEs and thereby control forwarding of traffic by the corresponding components within the data plane. This allows the software FIB stored in memory (e.g., on-chip RAM) of in each of PFEs 53 to be updated without degrading packet-forwarding performance of PE router 40. In some instances, control unit 42 may derive separate and different software FIBs for each respective PFEs 53. In addition, one or more of PFEs 53 may include packet-forwarding ASICs (not shown) that PFEs 53 program with a hardware-copy of FIB based on the software FIBs (i.e., hardware versions of the software FIBs) copied to each respective PFE 30. In other, more complex embodiment, L2 switch may have many more LCs 50 (e.g., 48 or 64 FPCs), each of which may have four PFEs 50 that each couple to up to sixteen interface cards 51.

Each of PFEs 53 maintains FIB 45' for each VPLS instance established by router 40 to associate network destinations with specific next hops and the corresponding interface ports. In general, when router 40 receives an outbound VPLS data packet on a pseudowire of the core-facing LAG, the corresponding PFE 53 egresses the encapsulated L2 communication and forwards the L2 communication on the logical interface associated with the customer-facing LAG of physical access links in accordance with FIB 45' based on information (e.g., labeling information) within the packet. When processing an inbound L2 communication received from one of the access links of the customer-facing LAG, the corresponding PFE 53 ingresses the L2 communication into the VPLS core by forming a VPLS packet and forwarding the VPLS packet on the logical interface associated with the core-facing LAG in accordance with FIG. 45'. At this time, the PFE 53 may push and/or pop labels from the packet to forward the packet along a correct pseudowire of the LAG.

The techniques may allow PE router 40 to generally facilitate an "active-active" link topology in a multi-homed layer two (L2) network by forming a multi-chassis link aggregation group ("LAG") of the L2 interfaces that service the physical access links of the multi-homed customer network and/or constructing a form of a multi-chassis LAG of the pseudowires PE that carry the encapsulated L2 communications through the VPLS core.

The operating environment of control unit 42 may be implemented solely in software, or hardware, or may be implemented as a combination of software, hardware or firmware. For example, control unit 42 may include one or more processors which execute software instructions. In that case, control unit 42 may include various software modules or daemons executing on an operating system, and may include a non-transitory computer-readable storage device, such as computer memory or hard disk, for storing executable instructions.

The architecture of router 40 illustrated in FIG. 4 is shown for exemplary purposes only. The disclosure is not limited to this architecture. In other embodiments, router 40 may be configured in a variety of ways. In one embodiment, for example, some of the functionally of control unit 42 may be distributed within PFEs 53. Elements of control unit 42 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 42 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 40, e.g., protocols. Control unit 42, in some examples, retrieves and executes the instructions from memory for these aspects.

Figure 5:
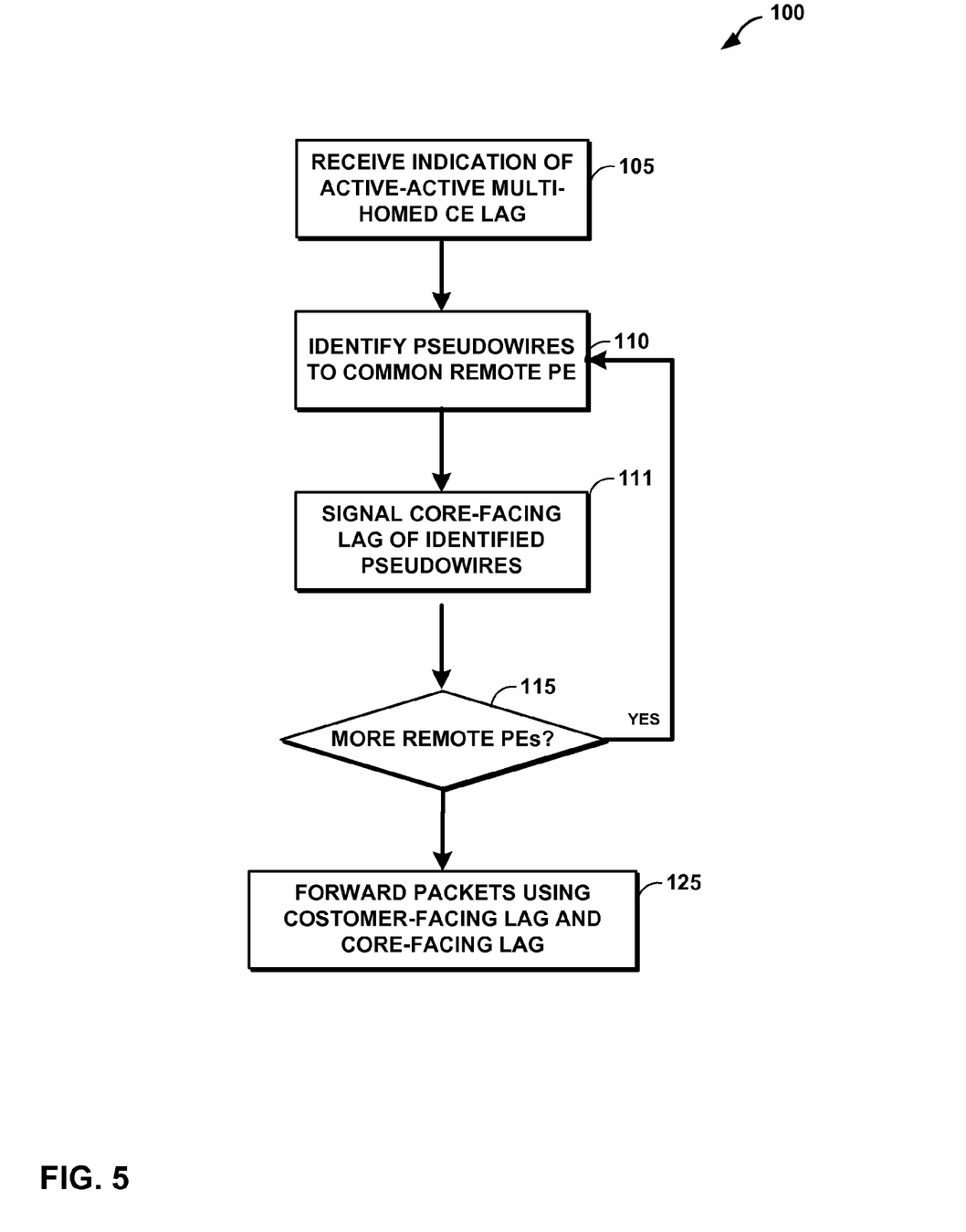
FIG. 5 is a flow diagram illustrating example operations of network devices consistent with techniques described in this disclosure.

FIG. 5 is a flow diagram illustrating example operations of network devices consistent with techniques described in this disclosure. For illustrative purposes, the operations are discussed as being performed by a PE router, e.g., PE routers 16A and 16C, in system 8 of FIG. 1. However, it should be understood that other routers or network devices may also implement the operations as shown.

In process 100 of FIG. 5, a PE router at the edge of a VPLS core receives an indication of a multi-chassis link aggregation group for L2 access links in an active-active topology (105). For example, PE router 16A or 16B may receive configuration information from an administrator, or a communication message from another router, that the CE router is in an active-active configuration and that the PE routers and the CE routers are or will be configured to form a multi-chassis lag group. As another example, remote PE router 16C may receive configuration information from an administrator, or a message from another router, that PE routers 16A, 16B are in a customer-facing LAG with a CE router that is in an active-active configuration. For example, remote PE router 16C may receive a BGP message including reachability data (e.g., NLRI data) in which one or more type-length-value (TLV) fields has been defined to indicate that PE routers 16A, 16B are configured as members of an active-active topology with multiple L2 access links to multi-homed VPLS site 14A. Moreover, in some cases, PE routers 16A-16C may have previously informed each other of their capability to support a core-facing multi-chassis LAG of a plurality of pseudowires within the VPLS domain. PE routers 16A-16C may, for example, utilize the BGP protocol to exchange not only routing topology information but reachability information in which one or more TLVs have been defined to indicate the PE routers are capable of forming the core-facing multi-chassis LAG within the VPLS domain to include a plurality of pseudowires.

Next, the PE router identifies any pseudowires within the core that will be used to transport L2 packets originating from or destined for the CE router associated with the customer-facing LAG, where the pseudowires are terminated by a common remote PE that is within the same VPLS domain (110). For example, PE routers 16A and 16B may identify pseudowires 21A, 21B that transport L2 communications for multi-homed L2 access network 27 to and from remote PE router 16C. Similarly, or alternatively, PE router 16C may identify pseudowires 21A, 21B that transport L2 communications for multi-homed L2 access network 27 to and from PE routers 16A, 16B that are members of the customer facing multi-chassis LAG.

Upon identifying the set of pseudowires, the PE routers that are members of the customer-facing multi-chassis LAG (e.g., PE routers 16A, 16B) and the remote PE (e.g., PE router 16C) signal each other to establish a multi-chassis LAG within the VPLS core using the pseudowires as if they constituted a single interface (111). This process may repeated in the event that the PE routers servicing the active-active multi-homed L2 access network connect to multiple remote PEs within the VPLS instance (yes of 115).

Upon establishing the customer-facing multi-chassis LAG and the core-facing multi-chassis LAGs with any remote PEs, the PE routers providing the VPLS service forward packets through the VPLS core using the multi-chassis LAGs as described herein (125).

Various embodiments have been described. These and other embodiments are within the scope of the following claims.

The invention claimed is:

1. A method comprising:
   forming, with a first provider edge (PE) router within a virtual private local area network service (VPLS) domain, a customer-facing multi-chassis link aggregation group (LAG) to include a plurality of active access links coupled to a multi-homed customer site associated with the VPLS domain, the multi-homed customer site being coupled to the first PE router via a first one of the active links and to a second PE router within the VPLS domain via a second one of the active links;

receiving a routing protocol message from at least one of the first PE router or the second PE router that indicates that the first PE router and the second PE router are coupled to the multi-homed customer site by the plurality of active access links;

in response to the routing protocol message, forming a core-facing multi-chassis LAG within the VPLS domain to include a plurality of pseudowires from the first and second PE routers to a remote PE router of the VPLS domain, wherein the first and second PE routers communicate layer 2 (L2) packets associated with the multi-homed VPLS customer site through the VPLS domain with the remote PE router using the plurality of pseudowires, wherein each of the pseudowires comprises a point-to-point tunnel that encapsulates the L2 packets and transports the L2 packets through the VPLS domain; and forwarding the L2 packets from the first PE router and the second PE router to the remote PE router over the pseudowires of the core-facing multi-chassis LAG of the VPLS domain as a single link.

2. The method of claim 1, further comprising, prior to forming the core-facing multi-chassis LAG, outputting at least one communication message from the remote PE router indicating that the remote PE router is capable of forming the core-facing multi-chassis LAG within the VPLS domain to include a plurality of pseudowires.

3. The method of claim 2, wherein the communication message comprises a routing protocol message that includes data that has been defined to indicate the remote PE router is capable of forming the core-facing multi-chassis LAG within the VPLS domain.

4. The method of claim 1, wherein forming a core-facing multi-chassis LAG comprises:
    identifying the plurality of pseudowires as a set of pseudowires within the VPLS domain that originate from either the first PE router or the second PE router and are terminated by the remote PE router to transport the L2 packets between the multi-homed customer site and the remote PE router; and
    forming the core-facing multi-chassis LAG to include the identified set of pseudowires.

5. A router comprising:
    a routing engine configured to form a customer-facing multi-chassis link aggregation group (LAG) to include a plurality of active access links that couple the router and a second router to a multi-homed customer site associated with a virtual private local area network service (VPLS) domain, wherein the routing engine is configured to form a core-facing multi-chassis LAG within the VPLS domain to include a plurality of pseudowires that connect the router and the second router to a common remote router of the VPLS domain, wherein each of the pseudowires comprises a point-to-point tunnel that encapsulates layer two (L2) packets and transports the L2 packets through VPLS domain;
    a routing protocol executing on the routing engine to receive a routing protocol message from the remote router indicating that the remote router is capable of forming a core-facing multi-chassis LAG of the plurality of pseudowires within the VPLS domain, wherein the routing engine forms the core-facing multi-chassis LAG in response to receiving the routing protocol message;
    an interface to receive the L2 packets from the multi-homed customer site on one or more of the active access links;
    a forwarding engine to tunnel the L2 packets from the router to the remote router over one or more of the pseudowires of the core-facing multi-chassis LAG as if the pseudowires were a single link.

6. The router of claim 5, further comprising a multi-chassis link aggregation protocol executing on the routing engine to form the core-facing multi-chassis LAG within the VPLS domain.

7. The router of claim 6, wherein the link aggregation protocol is configured to detect the customer-facing multi-chassis LAG of the plurality of active access links and, in response, automatically identify the plurality of pseudowires as a set of pseudowires within the VPLS domain that originate from either the router or the second router and are terminated by the remote router and forms the core-facing multi-chassis LAG to include the identified set of pseudowires.

8. A router comprising:
    a control unit having a processor executing a multi-chassis link aggregation protocol to form a core-facing multi-chassis link aggregation group (LAG) within a virtual private local area network service (VPLS) domain to include a plurality of pseudowires that connect the router to a plurality of provider edge (PE) routers of the VPLS domain, wherein each of the pseudowires comprises a point-to-point tunnel that encapsulates layer two (L2) packets and transports the L2 packets through the VPLS domain;
    a routing protocol executing on the processor to receive a routing protocol message from at least one of the plurality of PE routers, wherein the routing protocol message indicates that the plurality of PE routers are coupled to a multi-homed customer site by a plurality of active access links and are members of a customer-facing multi-chassis LAG, wherein the control unit forms the core-facing multi-chassis LAG in response to receiving the routing protocol message;
    a single logical interface associated with the plurality of pseudowires of the core-facing multi-chassis LAG; and
    a forwarding engine configured to tunnel the L2 packets over the pseudowires of the core-facing multi-chassis LAG of the VPLS domain using the single logical interface as if the plurality of pseudowires constituted a single link.

9. A computer-readable device storing program code to cause a control unit of a network router to:
    form a customer-facing multi-chassis link aggregation group (LAG) to include a plurality of active access links that couple a multi-homed customer site to a plurality of routers associated with a virtual private local area network service (VPLS) domain;
    receive a routing protocol message from a remote PE router of the VPLS domain, wherein the routing protocol message indicates that the remote router is capable of forming a core-facing multi-chassis LAG of pseudowires within the VPLS domain;
    form the core-facing multi-chassis LAG within the VPLS domain to include a plurality of pseudowires from the plurality of routers to the remote PE router, wherein each of the pseudowires comprises a point-to-point tunnel that encapsulates layer 2 (L2) packets and transports the L2 packets through the VPLS domain;

generate forwarding information to include a logical interface for the customer-facing multi-chassis LAG and a logical interface for the core-facing multi-chassis LAG; and install the forwarding information within a forwarding component of the router to control transport of the L2 packets between the customer site and the remote PE router via the VPLS domain over the plurality of pseudowires as a single link.

10. The router of claim 8, further comprising:

a single MAC table associated with the logical interface, wherein, when tunneling the L2 packets over the pseudowires, the forwarding engine forwards the L2 packets to the pseudowires using the single MAC table for all of the pseudowires.

* * * * *